United States Patent
Hayakawa

(10) Patent No.: US 9,661,172 B2
(45) Date of Patent: May 23, 2017

(54) INFORMATION PROCESSING APPARATUS, INFORMATION PROCESSING METHOD AND STORAGE MEDIUM WITH SEPARATE DEVICE DRIVER INSTALLATION AND APPLICATION REGISTRATION PROCESSING

(71) Applicant: CANON KABUSHIKI KAISHA, Tokyo (JP)

(72) Inventor: Mizuki Hayakawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/832,121

(22) Filed: Aug. 21, 2015

(65) Prior Publication Data
US 2016/0065776 A1    Mar. 3, 2016

(30) Foreign Application Priority Data
Aug. 29, 2014 (JP) ................................. 2014-175931

(51) Int. Cl.
*H04N 1/00* (2006.01)
*H04N 1/32* (2006.01)

(52) U.S. Cl.
CPC ..... *H04N 1/00941* (2013.01); *H04N 1/00236* (2013.01); *H04N 1/00973* (2013.01); *H04N 1/32529* (2013.01); *H04N 1/32561* (2013.01)

(58) Field of Classification Search
None
See application file for complete search history.

(56) References Cited

U.S. PATENT DOCUMENTS

| | | | |
|---|---|---|---|
| 2002/0095501 A1* | 7/2002 | Chiloyan | G06F 9/4415 709/227 |
| 2010/0178066 A1* | 7/2010 | Asahara | G06F 3/1203 399/12 |

FOREIGN PATENT DOCUMENTS

JP     2011-13809 A     1/2011

* cited by examiner

*Primary Examiner* — Thomas D Lee
(74) *Attorney, Agent, or Firm* — Fitzpatrick, Cella, Harper & Scinto

(57) ABSTRACT

There is provided an information processing apparatus that can reliably associate a device driver with an application even without updating the device driver itself. To achieve this, the information processing apparatus is provided with a registration unit capable of registering and updating association information between information for managing a device and a predetermined application regardless of whether a device driver is installed. This allows management by separating installation of a device driver from registration processing of an application.

20 Claims, 13 Drawing Sheets

| DEVICE ID | NAME | DATA |
|---|---|---|
| MX0000 series | CmdLine | ButtonUtility.exe |
| | Desc | Button Utility |
| | Icon | sti.dll,0 |
| | Name | ButtonUtility |
| MA0000 series | CmdLine | ButtonUtility.exe |
| | Desc | Button Utility |
| | Icon | sti.dll,0 |
| | Name | ButtonUtility |

FIG.7

INFORMATION PROCESSING APPARATUS, INFORMATION PROCESSING METHOD AND STORAGE MEDIUM WITH SEPARATE DEVICE DRIVER INSTALLATION AND APPLICATION REGISTRATION PROCESSING

BACKGROUND OF THE INVENTION

Field of the Invention

The present invention relates to an information processing apparatus and an information processing method for associating an event generated in an externally-connected device with an application program in a circumstance in which the application program is operated according to the event.

Description of the Related Art

In an information processing system consisting of an information processing apparatus such as a PC and a device such as an image reading device connected to the apparatus, it is necessary to associate a device driver for operating a device with an application program for processing information obtained from the device. More specifically, there is so-called pseudo push scanning in which an appropriate application is activated according to an event transmitted by an operation button of the image reading device to acquire image data. If the push scanning is performed, an application used for the push scanning may be registered as application information in a device management registry on an operating system.

Japanese Patent Laid-Open No. 2011-13809 discloses that when installing a device driver, an application is registered based on driver information on the device driver.

Unfortunately, in the configuration in which an application is registered based on device driver information when installing a device driver as disclosed in Japanese Patent Laid-Open No. 2011-13809, an application may be uniquely determined with respect to a device driver. Accordingly, if an application of a new version is released, the old device driver and the new application may not be associated with each other. In this case, a device driver also needs to be newly released. At this time, even if the above-mentioned device driver, for example, is a common device driver for devices of a plurality of models including a future model, a new device driver may need to be released to associate the device driver with a new application. Accordingly, even if the device driver is produced in consideration of a future model, the advantage of the device driver cannot be offered.

SUMMARY OF THE INVENTION

The present invention has been made to solve the above problems. Accordingly, an object of the present invention is to provide an information processing apparatus capable of easily registering an application for operating a device.

In a first aspect of the present invention, there is provided an information processing apparatus capable of operating an externally-connected device by using an application, the apparatus comprising: a registration unit configured to register an application corresponding to a type of device connected to the information processing apparatus in association information between information related to a type of device and an application, as an application for operating the device; and an updating unit configured to update the association information, wherein the updating unit can update the association information irrespective of a device driver corresponding to the device.

In a second aspect of the present invention, there is provided an information processing method for an information processing apparatus capable of operating an externally-connected device by using an application, the method comprising the steps of: registering an application corresponding to a type of device connected to the information processing apparatus in association information between information related to a type of device and an application, as an application for operating the device; and updating the association information, wherein in the updating step, the association information can be updated irrespective of a device driver corresponding to the device.

In a third aspect of the present invention, there is provided a non-transitory storage medium for storing a program for causing a computer to execute an information processing method, the method comprising the steps of: registering an application corresponding to a type of device connected to the information processing apparatus in association information between information related to a type of device and an application, as an application for operating the device; and updating the association information, wherein in the updating step, the association information can be updated irrespective of a device driver corresponding to the device.

Further features of the present invention will become apparent from the following description of exemplary embodiments (with reference to the attached drawings).

BRIEF DESCRIPTION OF THE DRAWINGS

FIG. 7 is an exemplary table in which a device ID is associated with an application;

DESCRIPTION OF THE EMBODIMENTS

Embodiments of the present invention will now be described with reference to the attached drawings. It should be noted that the following embodiments will not limit the present invention according to the scope of the claims. Further, all of the combinations of the features described in the present embodiments are not always essential for a solving method of the present invention.

First Embodiment

Figure 1:
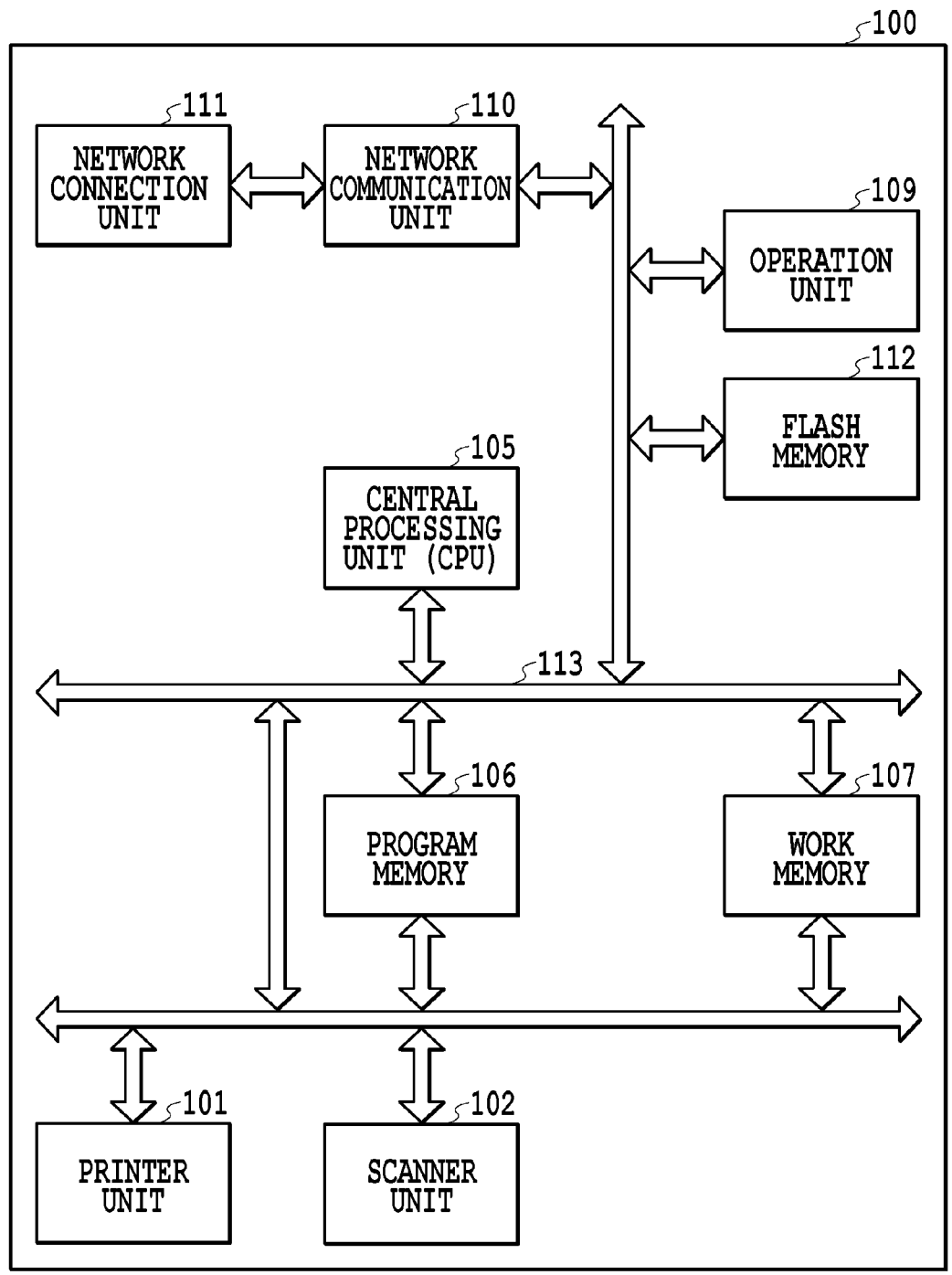
FIG. 1 is a block diagram showing a control configuration of an image reading device that can be used as a device.

FIG. 1 is a block diagram showing a control configuration of an image reading device 100 that can be used as a device of the present invention. In the present embodiment, the image reading device 100 has a printer function and a scanner function, and can provide their function services via a network.

A printer unit 101 achieves a printer function in the image reading device 100 and prints print data or the like received from the outside on a print sheet by an ink jet system, an electrophotography system, and the like. A scanner unit 102 achieves a scanner function in the image reading device 100, optically reads a document set on a document platen, converts the read image into electronic data, converts it into a designated file format, and transmits it to an external device via a network.

A central processing unit (CPU) 105 has control over the image reading device 100. The central processing unit 105 reads programs stored in a program memory 106 such as a ROM and executes various kinds of processing according to the read programs. At this time, a work memory 107 such as a RAM is used as a working area for buffering and the like.

An operation unit 109 is a user interface for providing information to a user or receiving instructions from the user. In a case where pseudo push scanning is performed, the user inputs an instruction in the operation unit 109.

A network communication unit 110 performs network communications via a network connection unit 111 under instructions from the central processing unit 105. The network communication unit 110 corresponds to at least either a wired LAN or a wireless LAN. In the case of the wired LAN, the network connection unit 111 serves as a connector for connecting a wired LAN cable with the image reading device 100. In the case of the wireless LAN, the network connection unit 111 serves as an antenna. A flash memory 112 stores therein source information on a packet received by the network communication unit 110. The above-described function units are connected to each other by a signal line 113.

Figure 2:
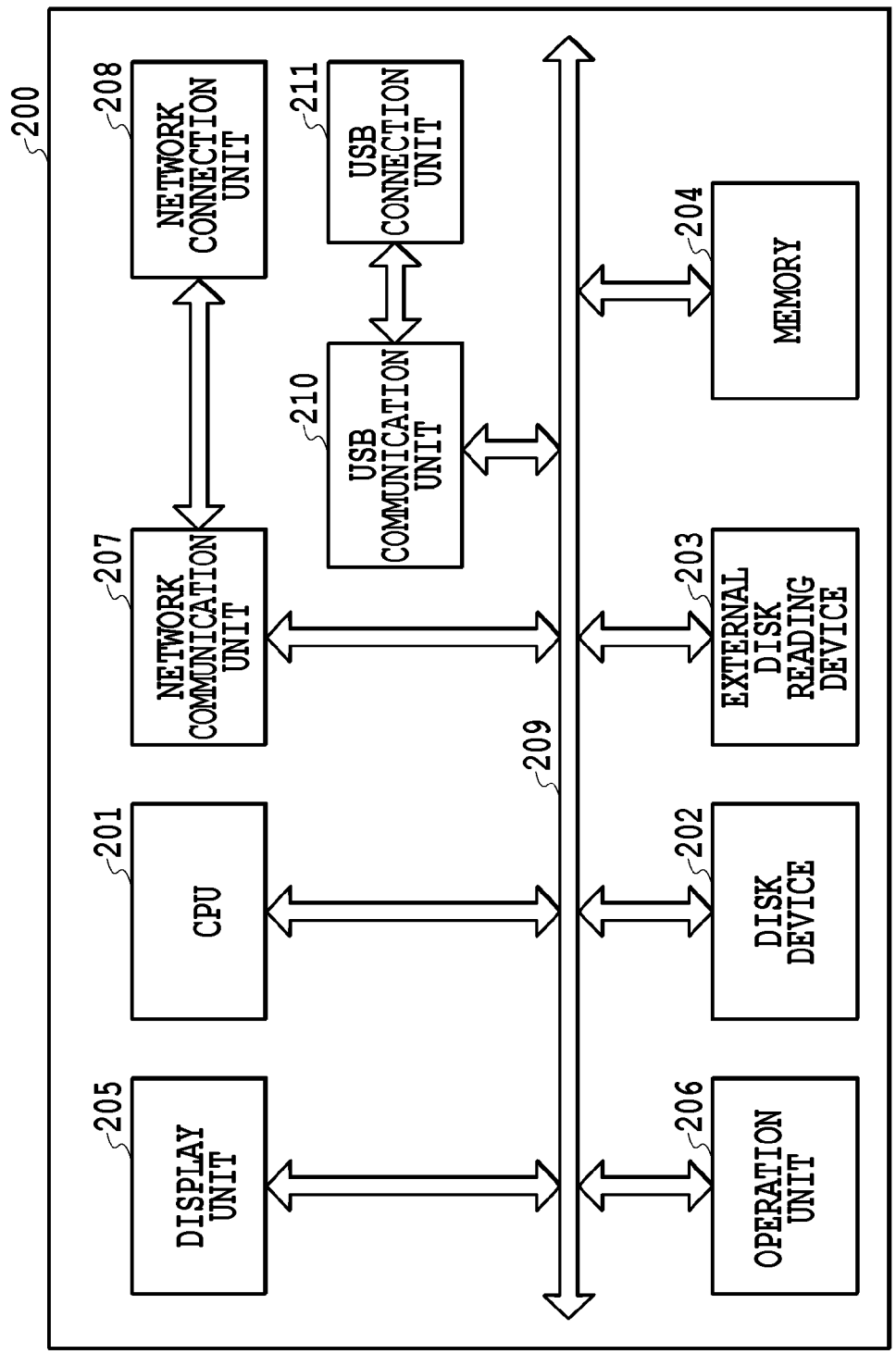
FIG. 2 is a block diagram showing a control configuration of an information processing apparatus.

FIG. 2 is a block diagram showing a control configuration of an information processing apparatus 200 that can be used in the present invention.

A CPU 201 has control over the information processing apparatus 200. An application program, an operating system (OS), and the like are installed in a disk device 202. The CPU 201 reads the application and OS installed in the disk device 202 to execute various kinds of processing. An external disk reading device 203 reads contents of an externally-connected storage medium such as a CD-ROM, and provides them to the CPU 201. A memory 204 consists of a RAM and the like. The CPU 201 uses the memory 204 for temporarily storing data as necessary and buffering. The flow charts described later with reference to FIGS. 5, 6, 8, 11, and 13 are executed by the CPU 201 while using the memory 204 in the OS environment installed in the disk device 202. It should be noted that the disk device also stores various kinds of files or the like.

Furthermore, the CPU 201 provides information to a user via a display unit 205 such as an LCD and receives an instruction from the user via an operation unit 206 such as a keyboard or a mouse.

A network communication unit 207 performs network communications via a network connection unit 208 under instructions of the CPU 201. Like the image reading device 100 as illustrated in FIG. 1, the network communication unit 207 corresponds to at least either a wired LAN or a wireless LAN. A USB communication unit 210 performs USB communications via a USB connection unit 211 such as a connector under instructions of the CPU 201. The above-described function units are connected to each other by a signal line 209.

Figure 3:
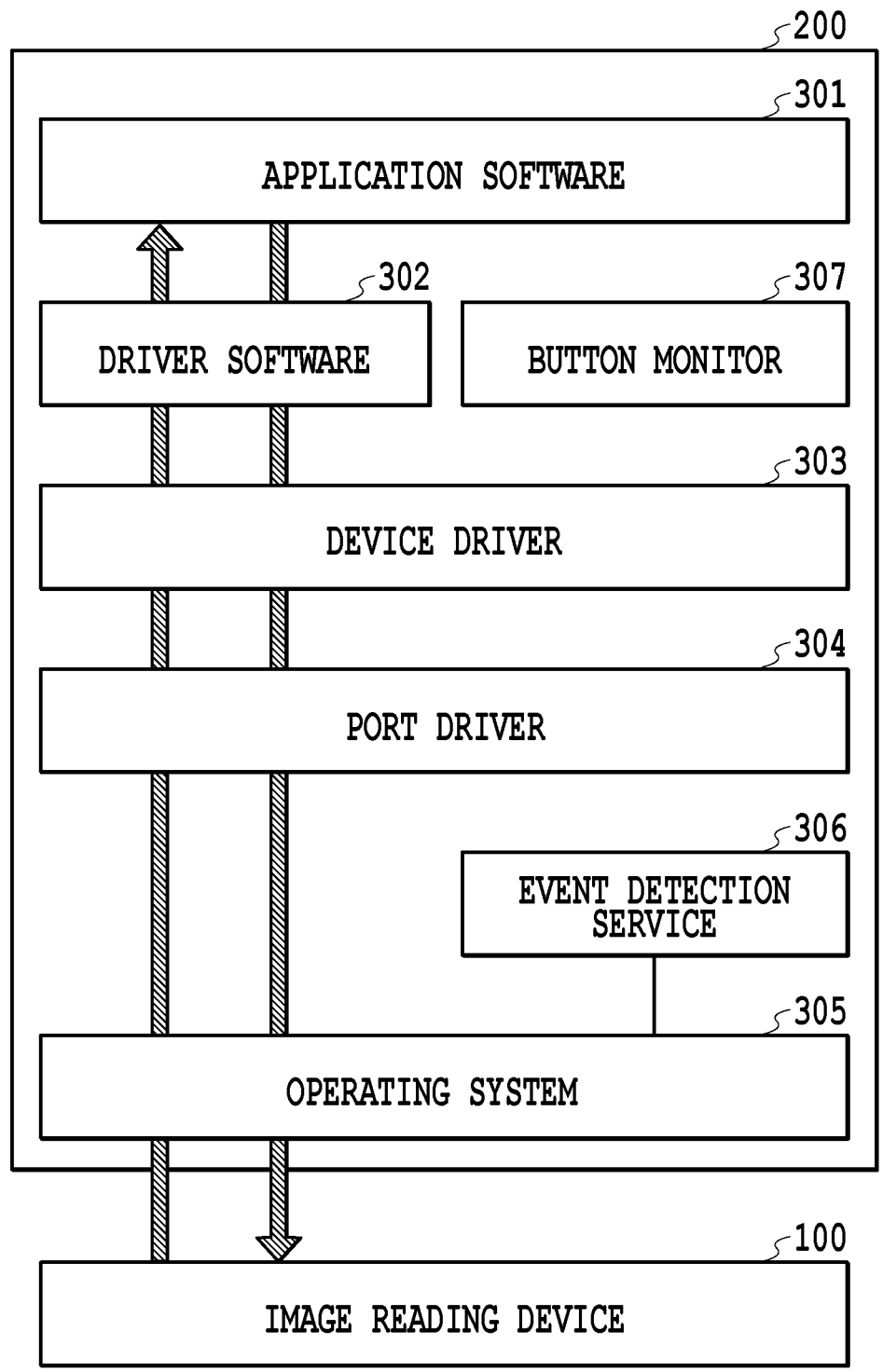
FIG. 3 is a view of a software configuration of the information processing apparatus related to the control of the image reading device.

FIG. 3 is a block diagram of the information processing apparatus 200, illustrating a software configuration related to the control of the image reading device 100. Application software 301 of the present embodiment is software directly used by a user to have the image reading device 100 perform a reading operation or display a read image. The user can specify a scanning method, a color setting, a resolution setting, or the like in the image reading device 100 and send an instruction to start the image reading operation by the application software 301. The application software 301 uses TWAIN or WIA (a Microsoft OS-standard image input API introduced in operating systems starting with Windows Me) and application programming interfaces (APIs) based on vender-specific standards. The settings or instructions from the user via the application software 301 are provided for driver software 302. The application software 301 also has a function of function setting of the operation unit 109 of the image reading device 100 and a function of storing files in various formats.

The driver software 302 activates a device driver based on the instructions and settings received from the application software 301 and provides an image acquired from the image reading device 100 to the application software 301. The driver software 302 has a unique graphical user interface (GUI) and the user can perform various settings via the GUI. More specifically, for example, the user can specify a crop area with respect to a preview image, set a resolution, set a reading mode (binary, 8-bit multivalued, 24-bit multivalued, etc.), set color adjustment such as gamma correction, and the like.

The device driver 303 sends a control command for controlling firmware installed in the image reading device 100 to the image reading device 100 to acquire an image. In the case of the image reading device without firmware, the device driver 303 accesses a control register of each module in the image reading device 100. Then, shading control, setting of a motor speed according to a resolution and a crop range, providing of gamma correction data received from the driver software 302, and the like are performed, whereby flow control is performed in the reading operation of the image reading device 100.

A port driver 304 performs communication control with the image reading device 100 depending on interfaces such as a parallel interface, USB, IEEE 1394, SCSI, LAN, and wireless LAN.

An operating system 305 is an operating system (OS) of the information processing apparatus 200, and can be Windows (registered trademark), for example. An event detection service 306 is software operating in the background of the OS 305 to provide a specific service without interaction with a user. Details of the event detection service 306 will be described later. A button monitor 307 is a program for receiving event information generated in the image reading device 100 in pseudo push scanning, for example, and transmitting a device ID of the image reading device 100 and the event information to an appropriate application.

Figure 4:
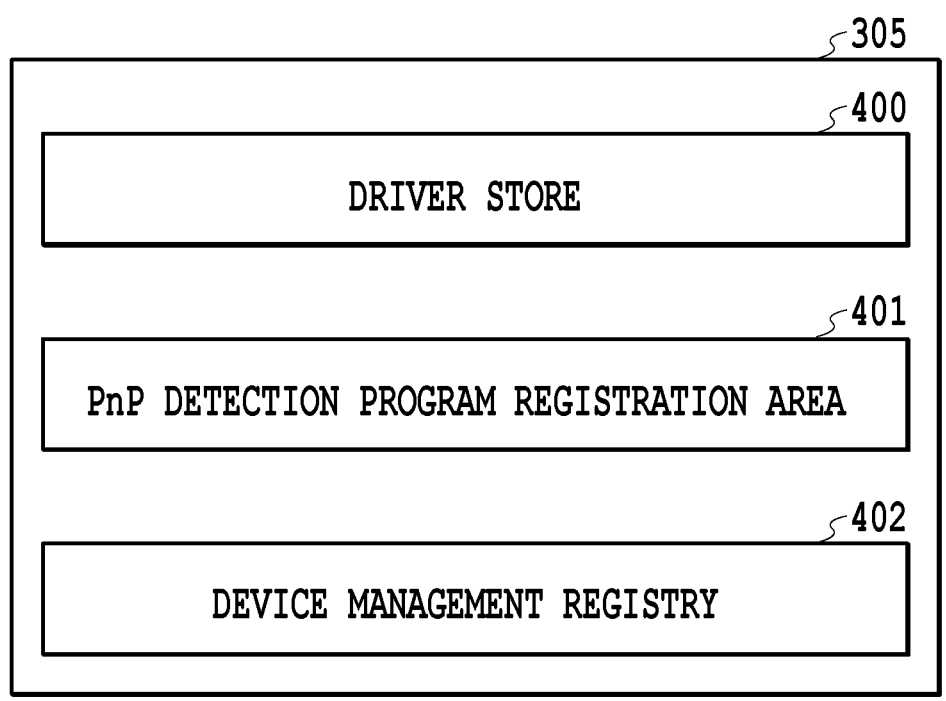
FIG. 4 is a schematic view illustrating a management state of information by an operating system.

FIG. 4 is a schematic view illustrating a management state of information by the OS 305, which is a feature of the present invention. A driver store 400 is an area that temporarily stores the device driver 303. If the device driver 303 in the driver store 400 is stored prior to shipment of the OS 305, an appropriate device driver can be read from the driver store 400 and installed when the image reading device 100 is connected to the information processing apparatus 200. More specifically, the device driver 303 can be installed without preparing an installer for the device driver separately. Not only prior to shipment of the OS 305, but also when the device driver is installed in the information processing apparatus along with the OS, the same system as that described above can be provided.

A PnP detection program registration area 401 is an area storing therein a program executed when Plug and Play (PnP) is generated. Basically, a driver installer which the OS possesses is stored, and the driver installer is activated when the PnP is generated. The driver installer searches one adaptive device driver from a plurality of device drivers stored in the driver store 400 based on the device ID of the image reading device 100 in which the PnP is generated, and installs the device driver.

In the PnP detection program registration area 401, another application can be registered by using an API (RegisterDeviceNotification) prepared by the OS. In the present embodiment, PnP such as a USB is described as an example, but any system can be employed as long as the OS detects connection of the device. Furthermore, a system by universal Plug and Play (UPnP) generated in network connection or a pairing operation using near field communication (NFC) can similarly be implemented.

A device management registry 402 is an area storing information for managing a device (image reading device 100) in which a device driver is installed. Once the device driver is installed, information necessary for operating the device driver and information necessary when the application uses the device driver are stored in the device management registry.

Figure 5:
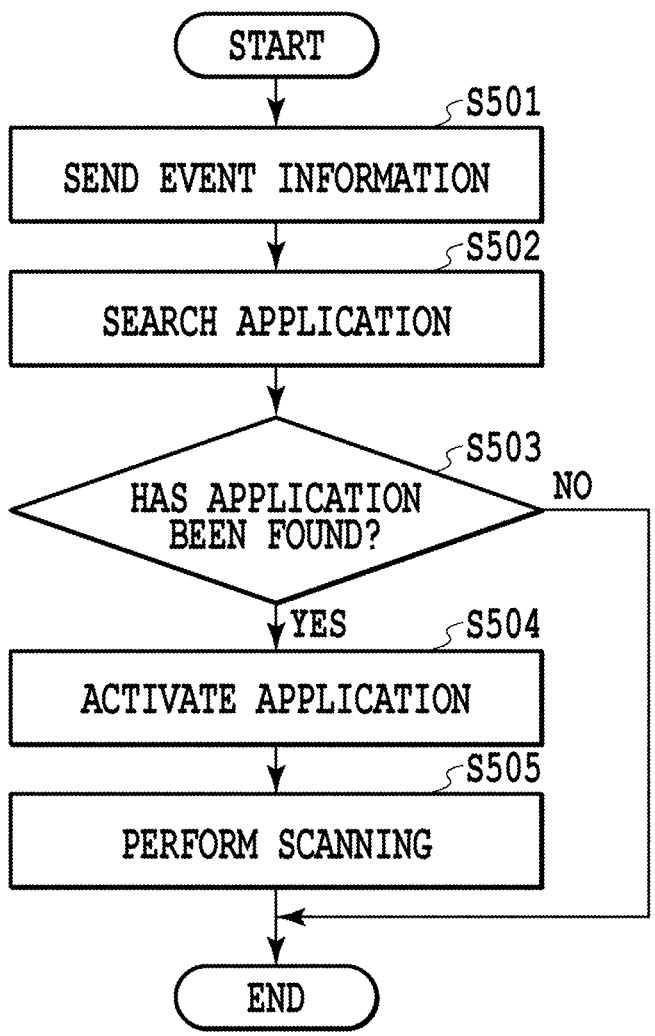
FIG. 5 is a flow chart showing the steps in a case where pseudo push scanning is generated.

FIG. 5 is a flow chart illustrating the steps performed by the central processing unit 105 of the image reading device 100 and the CPU 201 of the information processing apparatus 200 in a case where pseudo push scanning is generated.

If a user issues a pseudo push scanning command via the operation unit 109 of the image reading device 100, the present processing is started. Once the present processing is started, the central processing unit 105 of the image reading device 100 sends the instructed information and the device ID of the image reading device 100 to the connected information processing apparatus 200 as event information (S501).

The CPU 201 of the information processing apparatus 200 that has received the event information causes the button monitor 307 to search applications registered in the device management registry 402 for an application corresponding to the received device ID (S502). Then, in S503, it is determined whether the application corresponding to the device ID has been found. If it is determined that the application corresponding to the device ID cannot be found, the present processing is finished.

Meanwhile, if it is determined that the application corresponding to the device ID has been found, the process proceeds to S504, and the device ID and the event information are added to an argument of the application to activate the application. Then in S505, the image reading device 100 is caused to execute the reading operation according to the received event information and device ID. The present processing is finished.

As described above, in the pseudo push scanning, an application associated with the image reading device and installed in the information processing apparatus 200 is activated in response to a user input from the operation unit 109 of the image reading device 100 to perform predetermined reading processing. After the reading operation is finished, the application not only stores the received image but also can perform processing on the stored image or sends the stored image. More specifically, the application can perform OCR processing on the acquired image and upload an image in an external Web service such as a social networking service (SNS) or a cloud storage service.

Figure 6:
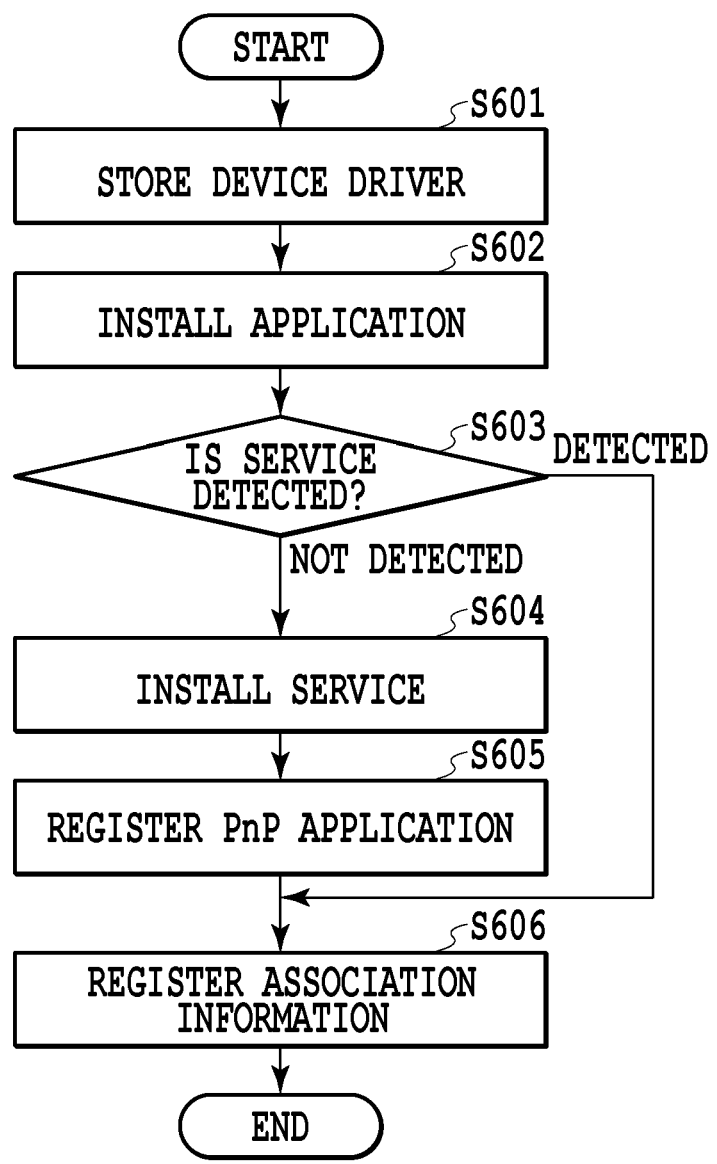
FIG. 6 is a flow chart of software installation processing prior to shipment of the information processing apparatus.

FIG. 6 is a flow chart illustrating the steps of software installation processing prior to shipment of the information processing apparatus 200. The present processing is started by an operator sending an instruction to activate an installer, and the CPU 201 of the information processing apparatus 200 executes the present processing according to the installer.

Once the present processing is started, in S601, the CPU 201 stores a device driver in a driver store. Then in S602, the CPU 201 installs application software.

In S603, the CPU 201 determines whether an event detection service 306 is installed. If it is determined that the event detection service 306 is installed, the process jumps to S606. Meanwhile, if it is determined that the event detection service 306 is not installed, the process proceeds to S604 to install the event detection service.

Next in S605, the CPU 201 registers the event detection service in the OS, so that the event detection service installed in S604 when a PnP event is generated is invoked. Such registration can be achieved by using an API called Register Device Notification, for example. By installing the event detection service 306 and registering it in the OS, the event detection service 306 is activated along with the startup of the OS 305. Further, if a PnP event is generated while the OS is running, the event detection service is notified of the message that the PnP event has been generated.

In S606, the CPU 201 registers, in the event detection service installed in S604, information associating the device ID for identifying the type of the image reading device 100 with an application.

FIG. 7 is an exemplary table in which a device ID is associated with an application in the event detection service. A pair of a unique device ID and an available application is registered with respect to each of a plurality of devices. In S606, the table shown in FIG. 7 is registered, and if a PnP event is generated by connection of a device, an application corresponding to the device ID of the device is registered in the device management registry 402 in FIG. 7. It should be noted that the registration processing will be described later with reference to FIG. 8.

Accordingly, updating the application in the table shown in FIG. 7 can update an application registered in the device management registry 402 when PnP is generated. That is, updating the table of FIG. 7 can register a new application as an application activated in the pseudo push scanning.

It should be noted that FIG. 7 shows a state in which a pair of a model of device and an application is registered. In a case where there are a plurality of applications satisfying requirements compatible with the device, association may also be performed based on the requirements. In this case, in S606, the requirements of the application compatible with the device may be described in the device driver side. In a case where an application will be registered in the device management registry later, the association can be confirmed by inquiring of the device driver.

If the registration of the event detection service is completed in S607, the present processing is finished. While the present processing is performed, the image reading device 100 and the information processing apparatus 200 do not need to be connected. In the case of shipping an information processing apparatus in which a device driver is preinstalled, the information processing apparatus is shipped as it is.

Figure 8:
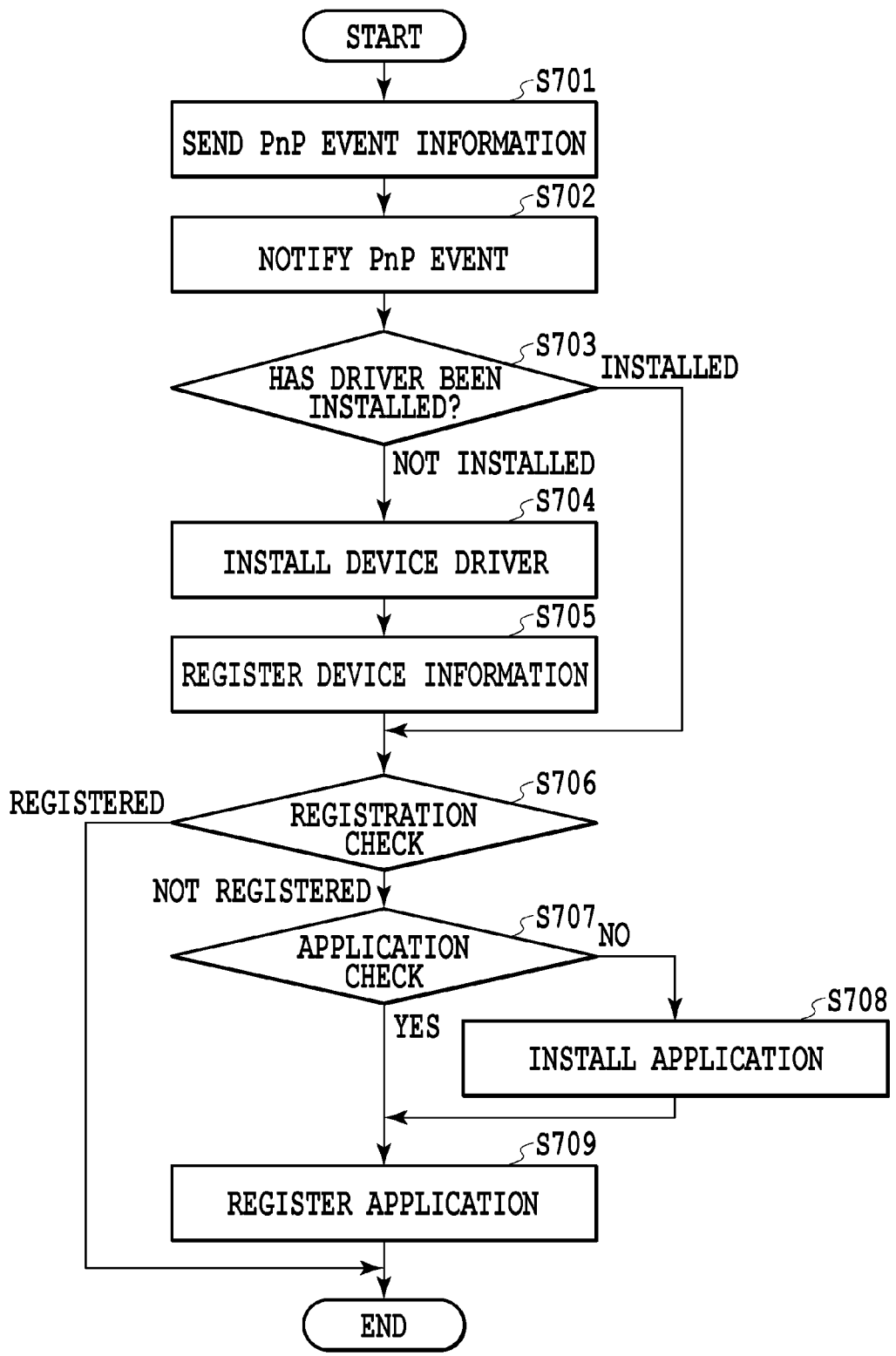
FIG. 8 is a flow chart illustrating the steps in a case where PnP is generated in a first embodiment.

FIG. 8 is a flow chart illustrating the steps performed by the central processing unit 105 of the image reading device 100 and the CPU 201 of the information processing apparatus 200 in a case where PnP is generated in the information processing apparatus 200 on which the processing of FIG. 6 is performed. This flow chart is performed by the event detection service 306. When the steps are performed, the information processing apparatus 200 is activated, and the event detection service installed in S604 of FIG. 6 is also functional. The present processing is started by the user connecting the image reading device 100 to the information processing apparatus 200.

Once the present processing is started, first in S701, the central processing unit 105 of the image reading device 100 sends PnP event information as well as the device ID of the image reading device 100.

The CPU 201 of the information processing apparatus 200 that has received the PnP event information performs the following processing in the OS environment. First in S702, a program to be notified if a PnP event is generated is searched, and the message that the PnP event has been generated is notified. In the case of the present embodiment, the event detection service has been registered, so the message is notified to the event detection service.

Next in S703, it is determined whether a device driver of a target image reading device has already been installed from the device ID included in the PnP event information. If the device driver has been installed, further installation is not needed, so the process jumps to S706. Meanwhile, if it is determined that the device driver has not been installed, the process proceeds to S704, and a corresponding device driver is selected from the driver store 400, and installation is performed. After the installation is completed, the process proceeds to S705, and the information on the image reading device (device information) is registered in the device management registry 402.

Figure 9:
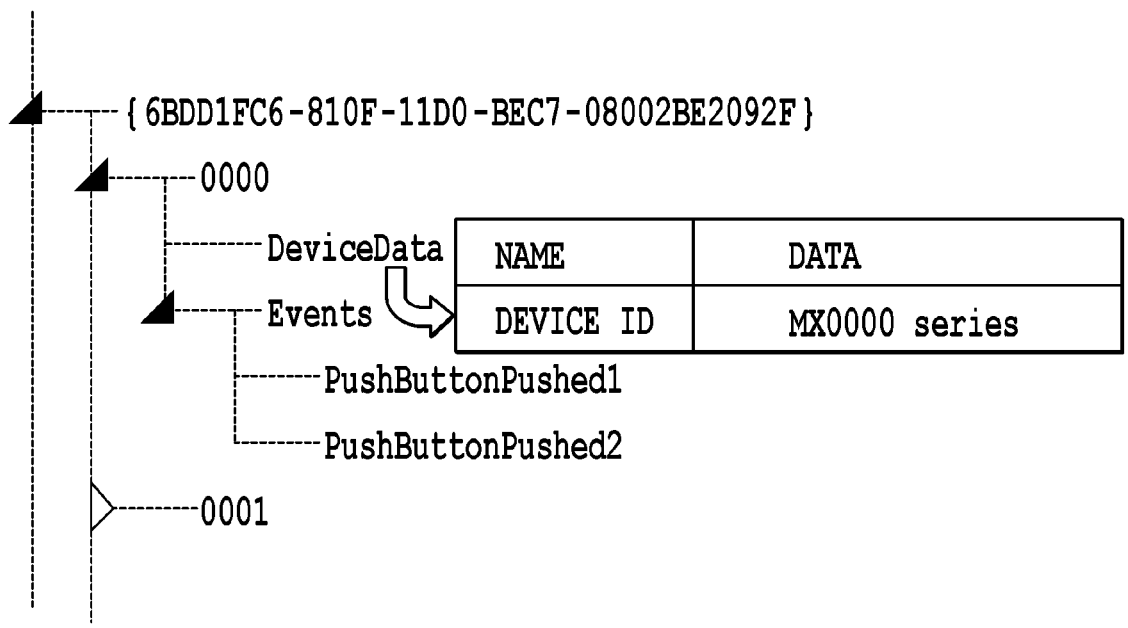
FIG. 9 is a view showing a management state of device information in a device management registry.

FIG. 9 is a view showing a management state of device information in the device management registry 402. The device management registry has a tree structure, and FIG. 9 shows a state in which new device information is registered in an address "0000". For the device information, areas are prepared (Push Button Pushed1, Push Button Pushed2) in which a device ID uniquely identifying a device and an application associated with a button pressed in pseudo push scanning are registered. When a new device driver is installed, an application associated with a button is not registered yet, and an area to which the information should be registered is empty. FIG. 9 shows the case where the device information on the device driver newly installed is registered in the address "0000", but a plurality of device drivers compatible with the information processing apparatus 200 may be registered in the device management registry 402. Accordingly, such an address varies depending on the order of the installation of the new device driver. Further, in FIG. 9, two areas are prepared for registering an application associated with a button. The number of areas is not particularly limited as long as the number of areas is 1 or greater.

After the registration of the device information is completed, the process proceeds to S706. In S706, the CPU 201 causes the event detection service to determine whether the application program corresponding to the above-mentioned device ID is registered in the device management registry 402 in the table shown in FIG. 7. If the application program is registered, the present processing is finished.

Meanwhile, if it is determined that the application program is not registered, the process proceeds to S707, and it is determined whether the application program has already been installed. If it is determined that the application program has not been installed, the process proceeds to S708, and the installation of the application is performed. For example, if there is a corresponding application program in a plurality of applications provided by an application store, the corresponding application program may be installed. Further, if there is a download site for the application prepared by a vendor, a corresponding application may be downloaded from the site. In addition, installation may be performed by a user by displaying a message prompting for installation.

Figure 10:
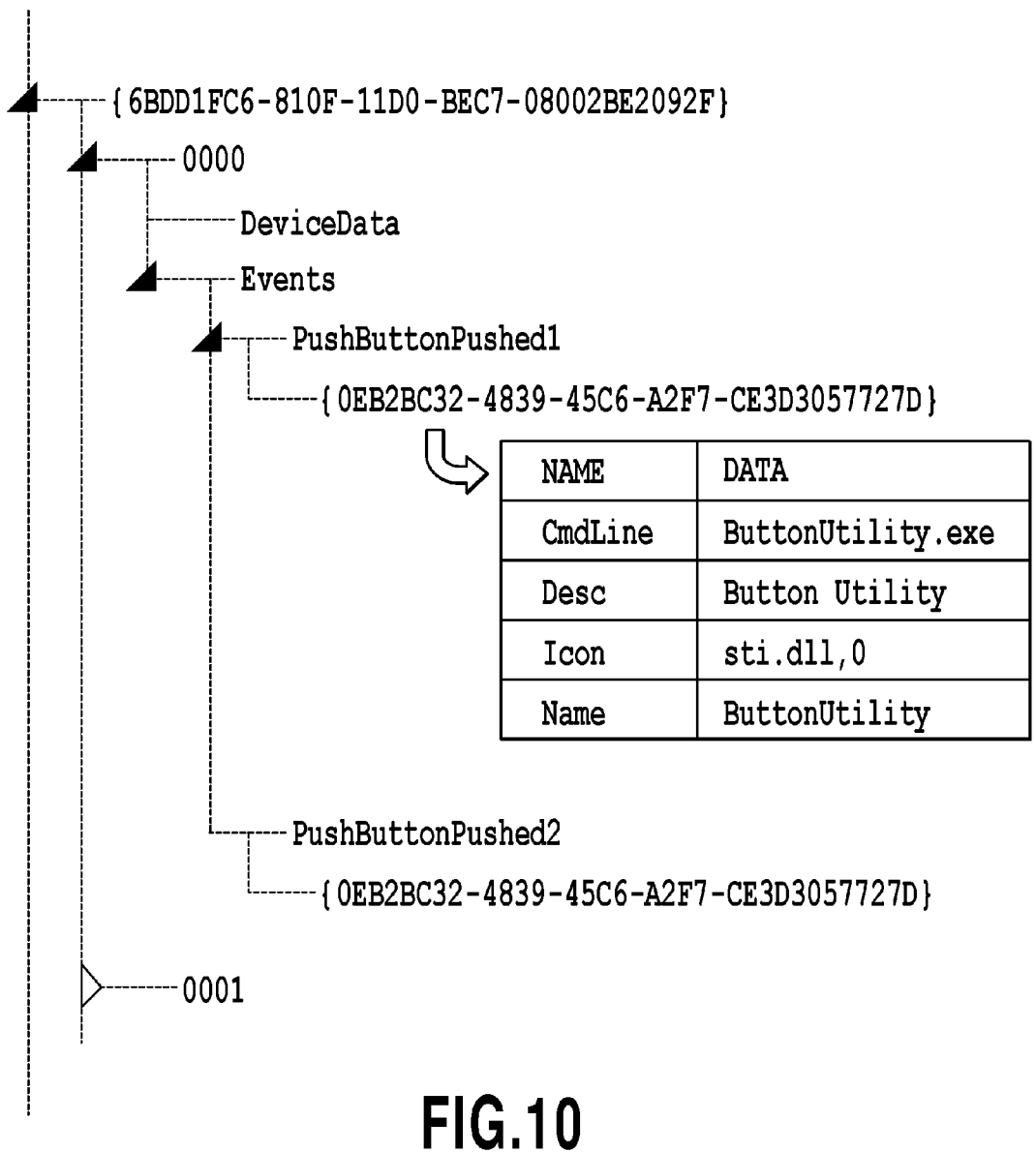
FIG. 10 is a view showing a state in which application information is registered in the device management registry.

Next in S709, the CPU 201 causes the event detection service to register application information in the device management registry 402 based on the registered device ID and application information. For example, referring back to FIG. 7, in a case where the device ID of the image reading device is "MX0000 series", the registered information is searched for an application corresponding to the device ID in FIG. 7, and the corresponding application is registered in the device management registry 402. FIG. 10 is a view showing a state in which application information is registered in the device management registry 402 illustrated in FIG. 9. An application is additionally registered in an area associated with an individual button in the address "0000". Such registration can be achieved by using an API called Register Event Call back Program, for example. The present processing is finished.

According to the above-described present embodiment, installing the event detection service program prior to shipment of the information processing apparatus allows management by separating the installation of the device driver from the registration of the application. More specifically, regardless of whether the device driver is installed, association of the device management information with the application can be registered or updated in the device management registry.

As shown in FIG. 7, an application program corresponding to the device ID of the device in which the PnP event has been generated is specified as an application program activated in the pseudo push scanning. Therefore, in a case where a new application is released, for example, updating the application specified in the table shown in FIG. 7 can automatically register the new application in the device management registry by PnP.

In the flow chart of FIG. 8, a step of installing an application is provided in S708. However, this step is not always needed. If an application is not installed, the step may be finished with an error. In this case, after the corresponding application is installed separately by a user, and at a timing at which PnP is newly generated, the above flow chart may be performed. Alternatively, along with the installation of the application, PnP may be generated in a pseudo manner or a notification may be sent to the event detection service so as to perform the present processing.

Second Embodiment

In the first embodiment, the event detection service is prepared by the installer prior to shipment of the OS. Meanwhile, in the present embodiment, a description will be given of the processing in a case where an event detection service is incorporated into an OS as one of the functions of the OS. Also in the present embodiment, the image reading device 100 illustrated in FIG. 1 and the information processing apparatus 200 illustrated in FIG. 2 are used.

Figure 11:
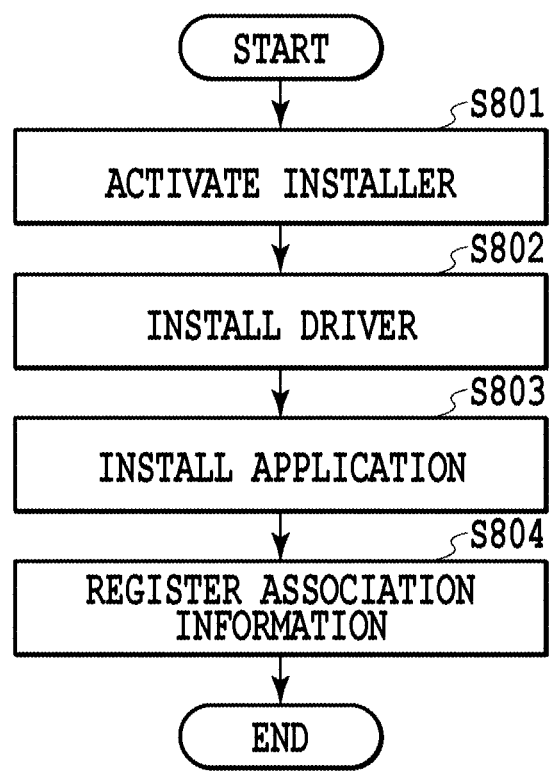
FIG. 11 is a flow chart illustrating the steps of software installation processing.

FIG. 11 is a flow chart illustrating the steps of software installation processing prior to shipment of the information processing apparatus 200. The present processing is started by an operator sending an instruction to activate an installer, and a CPU 201 of the information processing apparatus 200 performs the present processing according to the installer.

Once the present processing is started, the CPU 201 stores a device driver in a driver store in S801. Then in S802, the CPU 201 installs application software.

Then in S804, the CPU 201 registers, in an OS, information associating a device ID for identifying the image reading device 100 with an application (for example, the table shown in FIG. 7).

The present processing is finished. While the present processing is performed, the image reading device 100 and the information processing apparatus 200 do not need to be connected. In the case of shipping an information processing apparatus in which a device driver is preinstalled, the information processing apparatus is shipped as it is.

In the present embodiment, an event detection service is incorporated into the OS, and therefore, the installer does not need to particularly install the event detection service. The event detection service of the present embodiment is performed as a service included with the OS.

Figure 13:
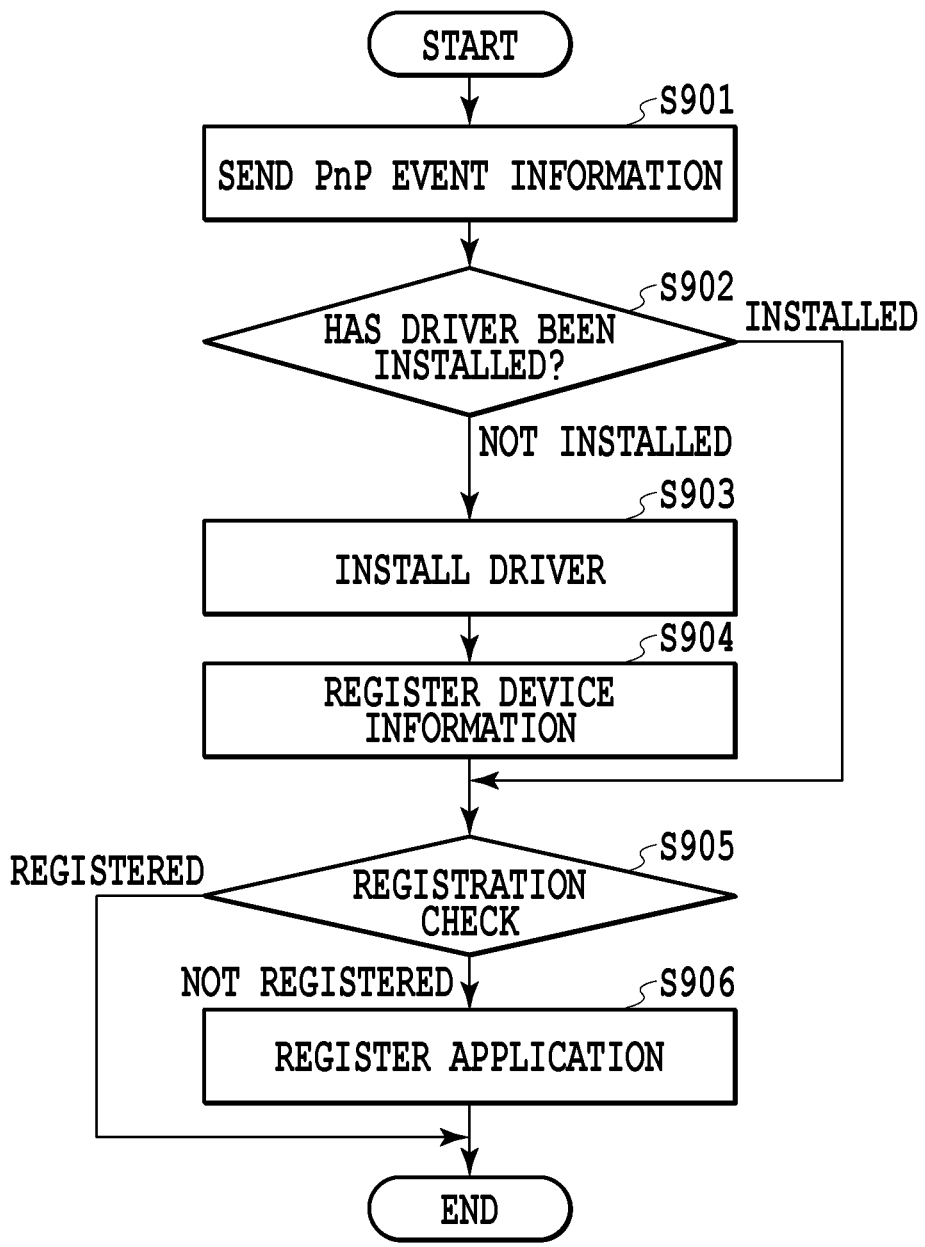
FIG. 13 is a flow chart illustrating the steps in a case where PnP is generated in a second embodiment.

FIG. 13 is a flow chart illustrating the steps performed by a central processing unit 105 of the image reading device 100 and the CPU 201 of the information processing apparatus 200 in a case where PnP is generated in the information processing apparatus 200 on which the processing of FIG. 11 is performed.

Once the present processing is started, first in S901, the central processing unit 105 of the image reading device 100 sends PnP event information as well as the device ID of the image reading device 100.

The CPU 201 of the information processing apparatus 200 that has received the PnP event information performs the following processing in the OS environment. First in S902, it is determined whether a device driver of a target image reading device has already been installed from the device ID included in the PnP event information. If the device driver has been installed, installation is not needed, so the process jumps to S905. Meanwhile, if it is determined that the device driver has not been installed, the process proceeds to S903, and a corresponding device driver is selected from a driver store 400, and installation is performed. If the installation is completed, the process proceeds to S904, and the information on the image reading device (device information) is registered in a device management registry 402.

If registration of the device information is completed, the process proceeds to S905. The CPU 201 causes the event detection service to determine whether an application program is registered in the device management registry. If the application program is registered, the present processing is finished.

Meanwhile, if it is determined that the application program is not registered, the process proceeds to S906, and the CPU 201 causes the event detection service to register application information in the device management registry 402 based on the registered device ID and application information. For example, referring back to FIG. 7, in a case where the device ID of the image reading device is "MX0000 series", registration information is searched for an application corresponding to the device ID in FIG. 7, and the corresponding application is registered in the device management registry 402. The present processing is finished.

Figure 12:
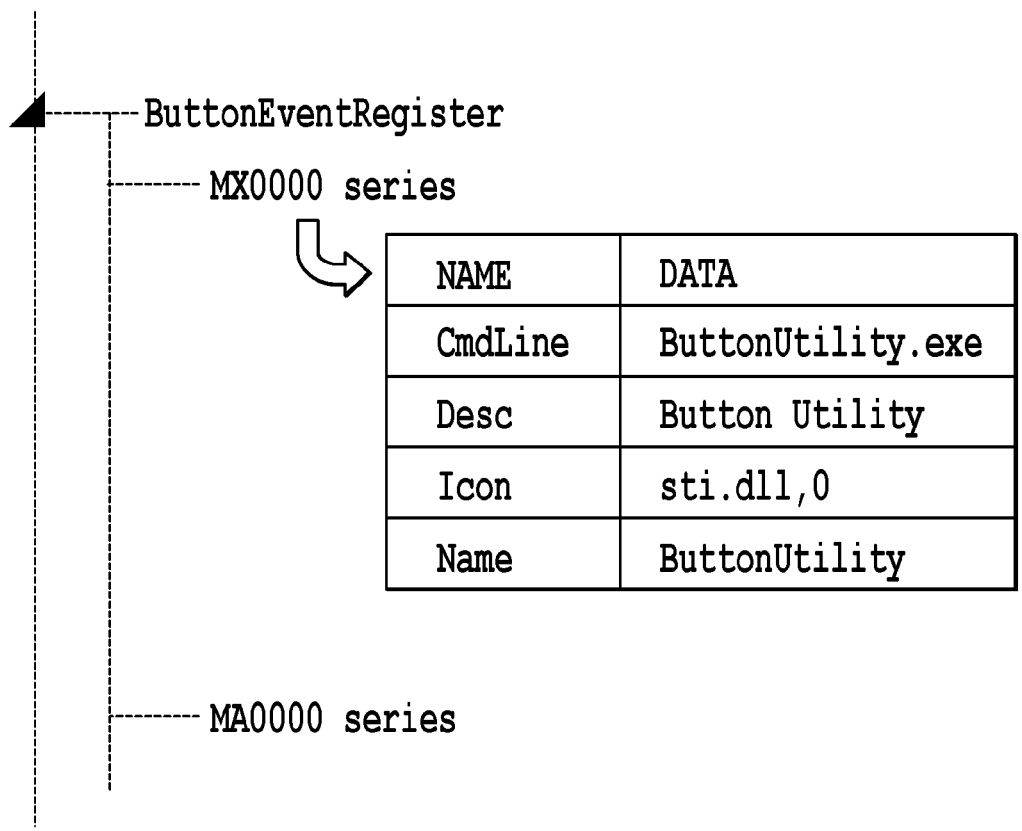
FIG. 12 is a view showing the device management registry in which application information is registered.

FIG. 12 is a view showing the device management registry 402 in which application information is registered through the processing of FIG. 13. In a registry area managed by the OS, a device ID and application information are associated with each other and registered. Such registration can be achieved by using an API called Register Event Callback Program, for example, in the OS side. It should be noted that FIG. 12 shows the state in which a pair of a model of device and an application is registered as one to one. However, in a case where there are a plurality of applications satisfying requirements compatible with the device, association may also be performed based on the requirements. In this case, the requirements of the application compatible with the device may be described in the device driver side. In S804, the application may be registered in the device management registry by the CPU 201 inquiring of the device driver.

According to the above-described present embodiment, incorporating the service program into the OS prior to shipment of the information processing apparatus allows subsequent management by separating the installation of the device driver from the registration processing of the application. More specifically, regardless of whether the device driver is installed, association of the device management information with the application can be registered or updated in the device management registry.

According to the above two embodiments, by completing preinstallation processing of the device driver for the information processing apparatus 200, subsequent application registration processing can be completed at a timing at which PnP is generated.

In such a mode, even after installation processing is completed, an installer of another application can renew association of the device ID with application information in the event detection service. More specifically, it is possible to overwrite the device management registry in which the old application information is registered with newly released application information.

Further, even in a case where a class driver, that is, a common driver among models, is preinstalled prior to shipment, it is not needed to perform application registration in association with all models of devices as in a conventional system. The latest application information at that time may be associated with a device ID of a target model and registered in the OS via the event detection service.

Furthermore, according to the above embodiments, since no additional processing is performed on the existing device driver, even in a case where the OS-standard device driver is used, the same application registration as the processing described above can be completed.

It should be noted that a description has been given of the assumption of the pseudo push scanning of the image reading apparatus, but the present invention is not limited to such a configuration. Examples of the device connected to the information processing apparatus include a digital camera, a camera phone, and the like. A similar effect can be obtained in a mode in which images captured by these devices are transmitted to the information processing apparatus. Also when an event generated in a digital camera or a camera phone is received by the information processing apparatus and transferred by activating an application, registration processing of the application is needed. Even in such a case, registration processing can be performed in the same manner as the above-described pseudo push scanning.

The object of the present invention can also be achieved by providing, for a system or an apparatus, a storage medium in which a program code of software that achieves the functions of the above embodiments is stored and by reading and executing the program code by the system or a computer in the apparatus. In this case, the program code itself read from the storage medium achieves the functions of the above-described embodiments, and the storage medium in which the program code is stored constitutes the present invention. Examples of the storage medium for providing a program code include a flexible disk, a hard disk, an optical disk, a magneto-optical disk, a CD-ROM, a CD-R, a magnetic tape, a non-volatile memory card, a ROM, and a DVD.

The present invention also includes the case where, based on the instructions of the program code read by the computer, part or all of the actual processing is performed by an OS running on the computer, and the functions of the above-described embodiments are achieved through the processing.

Furthermore, the present invention also includes the case where the series of the above processing is performed by writing the program code read from the storage medium in memory provided for a function extension board inserted into the computer or a function extension unit connected to the computer. In this case, based on the instructions of the written program, part or all of the actual processing is performed by a CPU or the like provided for a function extension board or a function extension unit, and the functions of the above-described embodiments are achieved through the processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-175931, filed Aug. 29, 2014, which is hereby incorporated by reference wherein in its entirety.

What is claimed is:

1. An information processing apparatus capable of operating an externally-connected device by using an application, the apparatus comprising a memory and at least one processor serving as:
   (i) a registration unit for registering an application corresponding to a type of device connected to the information processing apparatus in association information between information related to a type of device and an application, as an application for operating the device in the memory; and
   (ii) an updating unit for updating, in the association information in the memory, the application for operating the device already registered in the information processing apparatus,
   wherein the updating unit can update the application irrespective of a device driver corresponding to the device.

2. The information processing apparatus according to claim 1, wherein the registration unit performs the registration in a case where connection of the device is detected.

3. The information processing apparatus according to claim 1, wherein the at least one processor further serves as an installation unit for installing a device driver for the application to operate the device based on the information related to a type of device.

4. The information processing apparatus according to claim 3, further comprising a driver store for storing the device driver,
   wherein in a case where connection of the device is detected, the installation unit reads the device driver from the driver store and installs the device driver based on the information related to a type of device.

5. The information processing apparatus according to claim 1, wherein software for the registration unit is installed in the information processing apparatus separately from an operating system of the information processing apparatus.

6. The information processing apparatus according to claim 1, wherein software for the registration unit is installed in the information processing apparatus so as to be incorporated into the operating system, along with the operating system of the information processing apparatus.

7. The information processing apparatus according to claim 1, wherein in a case where an event is generated in the device while the device is connected, the device is operated by using the application.

8. The information processing apparatus according to claim 1, wherein the device is an image reading device operated by the application for scanning an image.

9. The information processing apparatus according to claim 1, wherein the at least one processor further serves as:
   (iii) a receiving unit for receiving, when the event is generated, an event information indicating the event and a device information indicating a type of the device,
   wherein the at least one processor operates the device according to the event indicated by the event information by using an application associated with the type indicated by the device information.

10. An information processing method for an information processing apparatus capable of operating an externally-connected device by using an application, the method comprising the steps of:
   registering an application corresponding to a type of device connected to the information processing apparatus in association information between information related to a type of device and an application, as an application for operating the device in a memory; and
   updating, in the association information in the memory, the application for operating the device already registered in the information processing apparatus,
   wherein in the updating step, the application can be updated irrespective of a device driver corresponding to the device.

11. The information processing method according to claim 10, wherein in the registering step, the registration is performed in a case where connection of the device is detected.

12. The information processing method according to claim 10, further comprising the step of installing a device driver for the application to operate the device based on the information related to a type of device.

13. The information processing method according to claim 12, wherein the information processing apparatus comprises a driver store for storing the device driver, and in the installing step, in a case where connection of the device is detected, the device driver is read from the driver store and installed based on the information related to a type of device.

14. The information processing method according to claim 10, wherein software for the registration in the registering step is installed in the information processing apparatus separately from an operating system of the information processing apparatus.

15. The information processing method according to claim 10, wherein software for the registration in the registering step is installed in the information processing apparatus so as to be incorporated into the operating system, along with the operating system of the information processing apparatus.

16. The information processing method according to claim 10, wherein in a case where an event is generated in the device while the device is connected, the device is operated by using the application.

17. The information processing method according to claim 10, wherein the device is an image reading device operated by the application for scanning an image.

18. The information processing method according to claim 10 further comprising the step of:
   receiving, when the event is generated, an event information indicating the event and a device information indicating a type of the device,
   wherein the device is operated according to the event indicated by the event information by using an application corresponding to the type indicated by the device information.

19. A non-transitory storage medium for storing a program for causing an information processing apparatus to execute an information processing method, the method comprising the steps of:
   registering an application corresponding to a type of device connected to the information processing apparatus in association information between information related to a type of device and an application, as an application for operating the device in a memory; and
   updating, in the association information in the memory, the application for operating the device already registered in the information processing apparatus,
   wherein in the updating step, the application can be updated irrespective of a device driver corresponding to the device.

20. An information processing method for an information processing apparatus capable of operating an externally-connected device by using an application, the method comprising the steps of:
   registering an application corresponding to a type of device connected to the information processing apparatus in association information between information related to a type of device and an application, as an application for operating the device; and
   updating the application for operating the device in the association information,
   wherein in the updating step, the application can be updated irrespective of a device driver corresponding to the device and in a case where an event is generated in the device while the device is connected, the device is operated by using the updated application.

* * * * *